Jan. 21, 1969  KENJI HONDA ET AL  3,423,275

HYPOTHERMIC SURGICAL OPERATION APPARATUS

Filed July 11, 1967

INVENTORS
KENJI HONDA
BY TEIJI KAYABA

H. Edward Mestern

3,423,275
HYPOTHERMIC SURGICAL OPERATION APPARATUS

Kenji Honda, 7—16 Moriai-Tanbayaji, and Teiji Kayaba, 71—1, Watari-Shiromukai, both of Fukushima-shi, Fukushima-ken, Japan
Filed July 11, 1967, Ser. No. 652,597
Claims priority, application Japan, July 14, 1966, 41/46,220
U.S. Cl. 165—26
Int. Cl. F25b 29/00; F28f 27/00; A61b 19/00

3 Claims

ABSTRACT OF THE DISCLOSURE

In a hypothermic surgical operation apparatus including means to circulate cold water and warm water through a tank containing an operating table, heat generated by a condenser of a refrigerator is utilized to heat water whereby to improve the thermal efficiency of the apparatus.

---

This invention relates to a low temperature surgical operation apparatus equipped with circulating type cooling and heating means.

In surgical operations of the head, chest, and especially heart, it has become common to decrease the body temperature of patients in order to lower metabolism of tissues and, moreover, to reduce the danger of excessive hemorrhage. In such a case, according to the prior cooling method, the operation table is placed in a water tank by means of wheels, and ice is fed into the tank to cool the body of the patient. By this method, however, as the ice is melted by the body temperature of the patient, whereby the temperature of the water contained in the tank is increased, it is difficult to maintain the body temperature at a desired low value during the operation. Further, in order to restore the body temperature of the patient to normal value after the operation, it is necessary to fill the water tank with warm water and maintain it at a constant temperature by constant supplementation of warm water. However, these cooling and warming operations are very troublesome and require additional mechanical operators to work in a relatively narrow operating room in which a limited number of surgeons are required to work. In addition, it is difficult to maintain the temperature of the water tank at constant values.

It is therefore the principal object of this invention to provide an improved low body temperature operation appartus equipped with circulating type cooling and heating means which can eliminate these difficulties and can operate at high thermal efficiencies.

Another object of this invention is to provide a novel low body temperature surgical operation apparatus in which temperatures during cooling and heating cycles can be automatically maintained at desired constant values.

Briefly stated, in accordance with this invention there is provided a low body temperature surgical operation apparatus comprising an operating table supported in a water tank, means including a refrigerator to circulate cold water through said water tank, said refrigerator including a condenser, means including a water heating tank to circulate warm water through said water tank, and means to supply heat generated by said condenser to said water heating tank thereby to improve the thermal efficiency of the apparatus.

Figure 1:
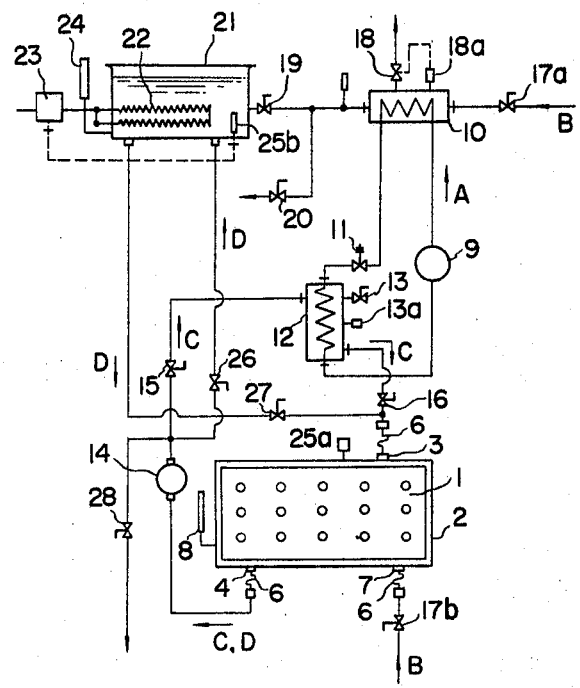
Figure 2:
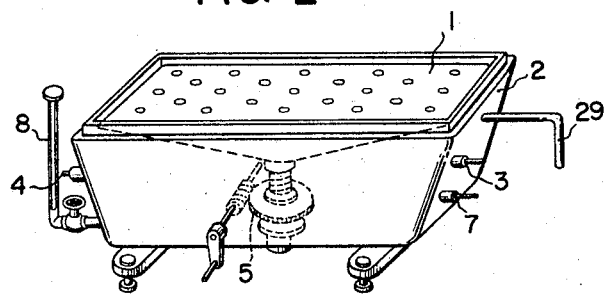

For a more complete understanding of this invention, reference may be had to the following detailed description in connection with the accompanying drawing, in which:

FIG. 1 is a diagrammatic representation of one embodiment of the novel low body temperature surgical operation apparatus; and FIG. 2 is a perspective view of a water tank containing a vertically adjustable operating table.

Referring now to the accompanying drawing, an operating table 1 adapted to support a patient is contained in a water tank 2 and lowered and raised therein by means of a suitable mechanism, such as a manually operated worm gear mechanism 5. The tank 2 is provided with inlet and outlet ports 3 and 4 for cold and warm water, which are connected to a cooling system and a heating system described below through flexible hoses 6, a feed water inlet 7, and a water level indicator 8 containing upper and lower limit contacts, not shown.

The cooling system comprises a refrigerant compressor 9, a water cooled type condenser 10, an expansion valve 11 and an evaropator or a heat exchanger 12. Water in the water tank 2 is circulated by means of a circulation pump 14 through the evaporator 12 and cooled thereby to a suitable low temperature, for example, from 2° to 4° C. The evaporator 12 is provided with an air valve 13 and a pressure switch 13a. Similarly, the condenser 10 is provided with an air valve 18, a pressure switch 18a, and electromagnetic valves 17a and 20 on the cooling water inlet and outlet sides. A temperature detector 25a is provided to control expansion valve 11 in response to the temperature of the water in water tank 2.

The heating system comprises a water tank 21 having an immersion electric heater 22 conectable to a source of electric supply through a switch 23, a water level indicator 24 also containing upper and lower limit contacts, not shown, and a temperature detector 25b for controlling switch 23. According to this invention, warm water in condenser 10 is supplied to water tank 21 through a suitable valve such as an electromagnetic valve 19 to recover the heat generated in the condenser 10. The water in water tank 21 is circulated through water tank 2 by the circulation pump 14, suitable electromagnetic valves 15, 16, 26 and 27 being provided to selectively connect water tank 2 either to evaporator 12 or water tank 21. Further, an electromagnetic valve 28 is provided to drain water tank 21. Arrows A, B, C and D indicate flows of refrigerant, Freon, for example, feed water, cold water, and warm water, respectively.

Temperature control is effected automatically in response to variations in conditions under control of a remotely located control panel (not shown) which is provided with suitable indicating lamps, buzzers, recording meters and the like required to display all conditions to the operators. Before commencing a surgical operation, a preparation push button (not shown) on the control panel is operated to open feed water valve 17b to admit water into water tank 2. After several minutes, circulation pump 14 is started concurrently with opening of electromagnetic valves 15 and 16 in the cold water circuit to circulate water through water tank 2 and evaporator 12. At the same time, feed water valve 17a is opened to supply cooling water to condenser 10. When the evaporator 12 is filled with water, its pressure switch 13a actuates to close air valve 13. Simultaneously therewith pressure switch 13a starts refrigerator compressor 9 to start the cooling system, which state is indicated by an appropriate lamp on the control panel. When condenser 10 is filled with cooling water, pressure switch 18a operates to close air valve 18 and to open electromagnetic valve 19 to supply water heated to about 30° C. in the condenser to water tank 21, thus recovering heat generated in the condenser. The refrigerant liquefies at about 35° C. in the condenser. The upper limit of the water level in water tank 2 is controlled by the upper limit contact of water level indicator 8 which functions to close feed water valve 17b. Slightly above the upper limit of the water level in water tank 2, there is connected an overflow pipe 29, so that when the operating table 1 and the patient supported thereon are immersed in cold water by the operation of mechanism 5, surplus water is drained off through overflow pipe 29. Expansion valve 11 is set to cause the liquid refrigerant to vaporize at a temperature of about −5° C. and is interlocked with temperature detector 25a of water tank 2 so as to control the temperature of the cold water therein not to fall below +2° C. The lower limit contact of water level indicator 24 attached to water tank 21 is situated at a level which insures complete immersion of electric heater 22, and closure of this contact closes switch 23 to energize electric heater 22. Further, temperature responsive switch 25b operates to close switch 23 when the temperature of warm water in tank 21 reaches 55° C. and open the switch when the water temperature falls below 50° C. The upper limit contact of water level indicator 24 is so positioned that the quantity of warm water between upper and lower limit contacts is sufficient to completely fill water tank 2 and the warm water circulating circuit. When the water level in water tank 21 reaches the upper limit contact of water level indicator 24, electromagnetic valve 19 is closed, whereas discharge valve 20 is opened to drain the cooling water flowing through condenser 10. Circulation of cold water through water tank 2 is continued until the body temperature of the patient decreases to 27° C. to 20° C. Upon completion of the surgical operation, when it is desired to warm up the cooled patient, a drain push button, not shown, on the control panel is operated to open drain valve 28, to close electromagnetic valves 15 and 16 and to stop compressor 9. Since at this time circulation pump 14 continues to operate, cold water in water tank 2 will be drained through drain valve 28. When the lower limit contact of water level indicator 8 mounted on water tank 2 closes, a pilot lamp (not shown) on the control panel is illuminated to indicate that drainage has been completed. At the same time, drain valve 28 is closed, while circulation pump is stopped. Now a heat push button (not shown) on the control panel is operated to close electromagnetic valves 26 and 27 in the warm water circulating circuit and to restart circulation pump 14 to circulate warm water in water tank 21 through water tank 2 as shown by arrows D. When the tank 2 is filled with warm water, the upper limit contact of water level indicator 8 operates to close electromagnetic valve 19 and open cooling water discharge valve 20, so that a definite quantity of warm water is circulated through water tanks 2 and 21. When the warming up is completed, a stop push button (not shown) on the control panel is operated to stop operation of all component parts. When it is necessary to drain water before or after such stopping, a drain push button (not shown) on the control panel may be operated.

Thus, it will be seen that this invention provides a novel low body temperature surgical operation apparatus which can maintain a patient at a desired low temperature, during operation and warm up the patient by warm water maintained at a constant temperature. Moreover, as the heat of condensation of refrigerant is utilized to warm water for warming up the patient, the overall thermal efficiency of the apparatus can be improved.

Although a specific embodiment of the invention has been shown and described, it will be understood that it is but illustrative and that various modifications may be made therein without departing from the scope and spirit of this invention as defined in the appended claims.

What we claim is:

1. A hypothermic surgical operation apparatus comprising an operating table supported in a water tank, means including a refrigerator to circulate cold water through said water tank, said refrigerator including a condenser for condensing a refrigerant, means including a water heating tank to circulate warm water through said water tank, and means to supply heat derived from said refrigerant by said condenser to said water heating tank.

2. The low body temperature surgical operation apparatus according to claim 1 wherein said condenser is cooled by cooling water passed therethrough and the cooling water is admitted into said water heating tank after cooling said refrigerant in the condenser.

3. The low body temperature surgical operation apparatus according to claim 1 wherein said water heating tank is provided with a thermostatically controlled electric heater.

References Cited

UNITED STATES PATENTS

| | | | |
|---|---|---|---|
| 3,007,473 | 11/1961 | Jackson et al. | 128—400 |
| 3,069,867 | 12/1962 | Rinquist | 165—22 |
| 3,074,410 | 1/1963 | Foster | 128—400 |

ROBERT A. O'LEARY, *Primary Examiner.*

CHARLES SUKALO, *Assistant Examiner.*

U.S. Cl. X.R.

165—48, 64, 138; 128—399; 62—261